United States Patent [19]
Urban, Jr.

[11] 3,974,267
[45] Aug. 10, 1976

[54] MANUFACTURE OF IRON OXIDES
[75] Inventor: Eugene M. Urban, Jr., Trenton, N.J.
[73] Assignee: Cities Service Company, Tulsa, Okla.
[22] Filed: Apr. 24, 1975
[21] Appl. No.: 571,115

[52] U.S. Cl. .................................................. 423/633
[51] Int. Cl.² .......................................... C01G 49/02
[58] Field of Search ........... 423/633, 140, 142, 634; 106/304

[56] References Cited
UNITED STATES PATENTS

| | | | |
|---|---|---|---|
| 1,420,985 | 6/1922 | Fireman | 423/634 |
| 2,255,607 | 9/1941 | Ayers et al. | 423/633 |
| 2,388,659 | 11/1945 | Ryan et al. | 423/633 |
| 2,558,302 | 6/1951 | Marcot et al. | 106/304 |
| 2,656,282 | 10/1953 | Clarke | 423/633 |
| 2,696,426 | 12/1954 | Marcot | 423/633 |

Primary Examiner—Oscar R. Vertiz
Assistant Examiner—Wayne A. Langel
Attorney, Agent, or Firm—George L. Rushton

[57] ABSTRACT

Ferrous hydroxide, formed from ferrous sulfate and sodium hydroxide at high alkalinity, is air-oxidized at a high rate to form ferric hydroxide seed crystals. The air rate is then decreased, and the seeds are allowed to grow to the desired acicular hydrated yellow ferric oxide.

3 Claims, No Drawings

MANUFACTURE OF IRON OXIDES

BACKGROUND OF THE INVENTION

This invention concerns the manufacture of iron oxide. More particularly, it concerns a method of producing a highly acicular, crystalline, yellow iron oxide. The utility of the invention resides in the production of pigmentary iron oxide.

The general technology of producing pigmentary iron oxide is well-known and is well summarized in the disclosure of U.S. Pat. No. 2,939,767. Broadly, the procedure involves oxidizing ferrous ion to ferric ion under conditions such that FeOOH, sometimes written as $Fe_2O_3.H_2O$ or $Fe_2O_3.xH_2O$, is obtained as the yellow oxide of iron (also called alpha ferric oxide or ferric oxide hydrate). This procedure usually takes place when the pH of the reaction is below 7, such as from 2.5 to about 4.0, so that the reaction environment is considered "acid". It is also possible to form hydrated ion oxide in an alkaline environment, as disclosed in U.S. Pat. No. 2,558,302. Both of these procedures result in many operating difficulties, leading to varying efficiencies of product yield and variable pigment colors.

SUMMARY OF THE INVENTION

I believe that I have overcome the operational problems of preparing alpha ferric oxide in a relatively strong alkaline environment by the process of my invention. My process produces a highly acicular, crystalline ferric oxide hydrate by the steps of a. adding, with agitation, an aqueous solution of ferrous sulfate to an aqueous solution containing at least a stoichiometric equivalent of a base selected from the hydroxides and carbonates of sodium and potassium, thus forming ferrous hydroxide and ferrous carbonate, respectively, with the pH of the mixture being maintained at 12 or higher and the temperature of the mixture being maintained in the range of about 20°–35°C., b. aerating the aqueous mixture with the oxygen-containing gas, at a rate of from about 0.00145 to about 0.00169 lbs. $O_2$/minute/lb. of added ferrous sulfate, (0.00145–0.00169 g.$O_2$/min./g. $FeSO_4$), said aeration resulting in the formation of nuclei of hydrated ferric oxide, c. allowing said nuclei to grow to acicular-shaped seeds having a diameter ranging from about 6 millimicrons (nm) to about 18 millimicrons (nm) and a length of from about 40 millimicrons (nm) to about 80 millimicrons (nm), such that approximately 15 to 40% of the ferrous hydroxide or ferrous carbonate is converted to hydrated ferric oxide, and d. reducing the aeration rate to a range of from about 0.00048 to about 0.00056 lbs. $O_2$/min./lb. of added ferrous sulfate (0.00048–0.00056 g.$O_2$/min./g. $FeSO_4$) and allowing the hydrated ferric oxide seeds to grow to the final, desired size, by the conversion of residual ferrous hydroxide.

The iron oxide pigment formed by this process is the commercially favored yellow oxide, and it has very desirable product characteristics of transparency, downflop or travel, and color.

DETAILED DESCRIPTION OF THE INVENTION

As mentioned above, the product of this process has various names, used by those skilled in the art. Yellow oxide of iron, alpha ferric oxide hydrate, alpha-FeOOH, alpah-$Fe_2O_3.H_2O$, alpha-$Fe_2O_3.xH_2O$, goethite, and hydrated iron oxide are some of the synonyms used.

In the process of this invention, cooperas (commercial $FeSO_4.7H_2O$) is the preferred iron starting material. Other compounds such as $FeCl_2$ can be used, but the industrial availability of copperas makes it the ferrous salt of choice. Depending on the source of the copperas, the purity of the material is important to the product. I specify that the ferrous sulfate used in the process should have less than 0.05 wt. % $TiO_2$ and less than 0.1 wt. % in total metals, such as Mg, Mn, Al. The ferrous sulfate solution used in the process may be prepared from commercial ferrous sulfate crystals, or a commercial solution of ferrous sulfate may be used. A saturated ferrous sulfate solution is conveniently used.

The alkaline reagent used to form the ultimate hydrated ferric hydroxide from the ferrous salt is selected from the hydroxides and carbonates of sodium and potassium. Other alkaline metals can be used, but the sodium and potassium compounds are commercially available and offer a high concentration of hydroxyl ions in solution. Due to their availability and lower cost, sodium hydroxide and sodium carbonate are preferred. Since a major reaction of the process is that between ferrous ion and hydroxyl ion to form ferrous hydroxide, those compounds furnishing ferrous ions and those furnishing hydroxyl ions are, broadly, the starting materials for the process. The alkaline reagents should not contain impurities in the amount that will cause problems during the reaction or that will form or leave traces of materials that will affect the transparency, downflop, or color of the product pigment. Broadly, commercially available reagents are satisfactory.

The amount of alkaline reagent, for example a 50 wt. % aqueous solution of sodium hydroxide, used in the reaction is that quantity necessary to give a pH, in the resultant mixture, of at least 12 or higher. Preferably, the pH will be 13 and above. To get and maintain this pH level of 13, the concentration of sodium hydroxide (or sodium carbonate) must be kept at approximately 100% excess to that based on the amount required to convert ferrous sulfate to ferrous hydroxide. It is possible to use only a 25% excess, but strict control of parameters is necessary to avoid a poor product. Thus, broadly, alkaline concentrations equivalent to a sodium hydroxide concentration of from about 25 to about 100 % excess can be used, but the preferred amount is approximately 100 % excess.

The order of mixing the ferrous solution and the alkaline solution is of importance to the final pigment product. Typically, the alkaline solution in the reactor is agitated and the ferrous solution added, in a fairly slow, but continuous, stream. The intent of the mixing is to form ferrous hydroxide at a high pH and to avoid localized areas of concentrated ferrous hydroxide that would lead to poor quality products. Sufficient agitation is used to break up and disperse any large agglomerates of ferrous hydroxide formed during the reaction; excessive agitation is avoided, thus reducing splattering or loss of product and minimizing power consumption. After the addition of the ferrous solution is complete, it is desirable to continue agitation for an additional time, such as 10 to 15 minutes, to insure good mixing, complete reaction, and minimum agglomeration of the hydroxide.

The reaction temperature is not critical, but it is preferably maintained in the 20°–35°C. range, most preferably in the 24°–32°C. range. At low temperatures, more oxygen dissolves in the aqueous mixture and the reaction rate is thus increased; at high temperatures, less oxygen is dissolved and the rate is decreased. Broadly, the reaction can proceed at subatmospheric, atmospheric, or superatmospheric pressure, but the extra equipment necessary for vacuum or pressure reaction make atmospheric pressure the preferred parameter.

After the ferrous hydroxide (or ferrous carbonate), as a thin slurry, is formed, an oxygen-containing gas, such as air or oxygen-enriched air, is bubbled through the slurry to oxidize the ferrous hydroxide to ferric hydroxide (or hydrated ferric oxide). Similarly, but in a different manner, the ferrous carbonate is also converted to hydrated ferric oxide. This aeration step is done by one of the many ways known to those skilled in the art, such as by sparging through pipes at the bottom of the reactor. Naturally, sparging efficiency is important. It is well known in the art how to form small gas bubbles for aeration, but the maintenance of these small bubbles, to furnish optimum contact during aeration, is sometimes difficult. Therefore, I propose good sparging efficiency for this portion of the process.

This is the stage during which nuclei of ferric hydroxide form, so control of conditions during this time is important. I have found that aerating the slurry at a rate of from about 0.00145 to about 0.00169 lbs. $O_2$/min./lb. of ferrous sulfate (or equivalent) (0.00145–0.00169 $g.O_2$/min./$g.FeSO_4$) results in the optimum formation of ferric hydroxide nuclei. Broadly these nuclei are clusters or agglomerates of hydrated ferric oxide molecules. These nuclei then grow to acicular-shaped seeds having a diameter ranging from about 6 millimicrons (nm) to about 18 millimicrons (nm). Typically, the blue-gray color of the ferrous slurry gradually changes to a pea-green and then yellow color. This seeding period typically lasts about 10 to 40 minutes, preferably 20 or 30 minutes. Longer seeding periods will result in the formation of new seeds simultaneously with the growth of previously-formed seeds, thus producing a wide variety of crystal sizes, which in turn results in a lower quality pigment. I have found that the acicular seeds having an average diameter of about 12 millimicrons (nm), and varying from about 6 millimicrons (nm) to about 18 millimicrons (nm) and an average length of about 50 to 60 millimicrons (nm), and varying from about 40 to about 80 millimicrons (nm), are a very desirable size for further growth to the finished pigment.

When from approximately 15 to about 40% of the ferrous hydroxide (or carbonate) is converted to hydrated ferric oxide, as a result of the fairly vigorous oxidation and growth described above, the aeration rate is reduced, to allow the hydrated ferric oxide seeds to grow, through the conversion of the residual ferrous hydroxide. The aeration is reduced to a flow of from about 0.00048 to about 0.00056 lbs. $O_2$/min./lb. of ferrous sulfate feed (0.00048–0.00056 g. $O_2$/min./$g.FeSO_4$). This reduced rate is approximately 30–35% of the initial flow rate, and I feel that this slow rate, applied during the growth period of the hydrated ferric oxide seeds, is the heart of the invention. This lower aeration is continued until conversion of the ferrous hydroxide to ferric oxide is essentially complete, as shown by chemical analysis.

Upon completion of the oxidation to the desired product, the iron oxide is separated from the residual solution, typically by filtering, such as through a filter press. The filter cake, of approximately 28% solids, is washed to remove substantially all the foreign ions, such as sodium and sulfate, and is then oven-dried at about 100°C. Care should be taken that the oven temperature does not exceed 140°–150°C., because discoloration of the yellow oxide occurs at the higher temperature. When the cake is dried to approximately 1–2% moisture, it is milled to a powder, such as by using a fluid energy mill or a micro-pulverizer. The finished oxide particles have an average diameter of about 20 millimicrons (nm) and an average length of about 200 millimicrons (nm).

The following examples are illustrative of the invention and should not be interpreted as limits for the parameters, since many variations are possible in the process without departing from the spirit or scope thereof.

EXAMPLE 1

A three hundred gallon (1130 l.) reactor, fitted with a recirculation pump, was charged with 238 gals. (900 l.) water and 16 gals. (605 l.) 50 wt. % commercial sodium hydroxide. After 10 to 20 min. of mixing by the pump, the temperature was 28°C. and the pH=13.1. Then, over a 10 to 20 minute interval, 46 gals. (175 l.) of a 20 wt. % ferrous sulfate solution were added to the alkaline solution, with mixing. This procedure assures the formation of ferrous hydroxide at a high pH and reduced the formation of localized areas of concentrated ferrous hydroxide. Mixing was continued for an additional 10 minutes after the ferrous sulfate addition was complete.

To avoid shearing during subsequent crystal development, the recirculation pump was turned off, and air was sparged into the bottom of the reactor tank through stainless steel plates or pipes, at a rate of from about 7.2 to about 8.4 scfm (0.2038–0.2378$m^3$/min.). This sparged air not only served as an oxidizing agent, but it also mixed and circulated the solution, thus assuring a steady rate of oxidation of the ferrous ion to ferric ion. During this initial sparging period of about 20 minutes, the ferrous hydroxide, initially formed when the ferrous sulfate reacted with the sodium hydroxide, was oxidized to ferric oxide and these ferric oxide nuclei grew to acicular-shaped seeds having a diameter of from about 6 millimicrons (nm) to about 18 millimicrons (nm) and a length of from about 40 to about 80 millimicrons (nm). Aeration at this rate, of from about 0.00145 to about 0.00169 lbs. $O_2$/min./lb. of added ferrous sulfate (0.00145–0.00169 $g.O_2$/min./$g.FeSO_4$), and for this time produced approximately 14.3 lbs. of hydrated ferric oxide seeds, representing approximately 26% conversion of ferrous ion to ferric ion. This seeding period should not be longer than about 30 minutes, since longer aeration time at the above rate results in the formation of new seeds plus the additional growth of the already-formed seeds, producing a wide variety of crystal sizes that results in a poor quality pigment.

The air flow was then reduced to a rate of from about 2.4 to about 2.8 scfm (0.068–0.079$m^3$/min.). At this reduced rate (of from about 0.00048 to about 0.00056 lb. $O_2$/min./lb. of added ferrous sulfate)(0.00048–0.00056 $g.O_2$/min./$g.FeSO_4$), the already-formed ferric oxide seeds grew while the residual ferrous hydroxide was oxidized to hydrated ferric oxide. This crystal growing stage continued until essentially complete conversion of ferrous to ferric ions was accomplished, resulting in ferric oxide crystals having the approximate dimensions of about 20 millimicrons (nm) diameter and about 200 millimicrons (nm) length.

The hydrated iron oxide was recovered by a filter press and washed, and the press cake was dried at about 100°C., to a 1–2% moisture level. The dried oxide was then milled to a powder, by the use of a Bantom micro-pulverizer.

As is well known in the art, the yellow iron oxide can be calcined at about 300°C. to form the red oxide. DTA (differential thermal analysis) indicated an endotherm at a temperature of 292°C., thus confirming the calcine temperature of 300°C. for the conversion. Over-calcination, by rate or by temperature, results in degraded pigment quality.

To show the difference between products made according to the invention and competitive, prior art products, samples of each were mixed with a base $TiO_2$ pigment, in a 50–50 wt. ratio, and the mixtures were measured, comparatively, for color match, using a Diano Hardy spectrophotometer. The prior art mixtures were measured against the sample of the invention, as a control. The units represent MacAdam units, with 1.0 unit representing a noticeable color difference from the product of the invention:

|  | Light-dark | Red-green | Yellow-blue |
| --- | --- | --- | --- |
| Sample A | 4.0 darker | 5.2 redder | 1.4 bluer |
| Sample B | 4.6 darker | 0.1 redder | 4.6 bluer |
| Sample C | 5.3 lighter | 2.0 greener | 0.8 yellower |
| Sample from the invention | control | control | control |

One skilled in the color field will recognize the superiority of the sample of the invention.

The product of the invention not only has better color in comparison with prior art products, as detailed above, but is also comparable in the characteristics of transparency and downflop.

The test for transparency is based on ASTM D 1003 (Haze Test) and uses the following procedure:

Draw down a 0.0015 inch thick(wet) film on a 2 inches × 3 inches glass slide. It is important that all drawdowns are uniform in thickness. Dry the slides and evaluate them for % Haze, (and thus, % Transparency), using a Gardner Hazemeter, as follows:

1. Calibrate the instrument to read (with no sample) 0 haze and 100 total transmitted light.
2. With sample in place, take haze and total transmitted light readings.
3. Divide the haze reading by the total transmitted light reading to obtain % haze, i.e., $$\frac{.11 \text{ Haze}}{.20 \text{ Total Transmitted}} \times 100 = \% \text{ Haze}$$

4. Determine the transparency value by subtracting the % haze from 100, i.e., 100 − % Haze = % Transparency Value Using the above procedure, a sample from the product of the invention (called Control) was compared with prior art products. Samples A and C are based on the similarly-labeled pigment samples from the above color tests, while Sample D is another prior art pigment. Sample B from the color test was not tested for transparency and downflop.

|  | Transparency Value(%) |
| --- | --- |
| Sample A | 95.3 |
| Sample C | 93.4 |
| Sample D | 93.1 |
| Control | 94.5 |

These samples are considered as generally comparable.

The same samples were compared for downflop. The following test method was used:

1. Prepare paint samples of the pigments in question without any aluminum flake.
2. Draw down at 0.03 inch all the samples to be tested on a black Morest chart, leaving an area of the chart uncoated for use as the black reference standard.
3. Determine the color differences between the samples and the black reference standard under Illuminate A using the MacAdam system by the use of the Diano Hardy Spectrophotometer.

The $\Delta L$ value will indicate the degree of light scattering developed by the sample. It is the light scattering effect that has a negative effect on downflop. (The less light scattering, the lower the $\Delta L$, and thus the better the expected downflop.)

It is to be noted that this test predicts downflop without the necessity of preparing samples containing metallic flakes. The correlation between predicted and observed downflop values is very high.

|  | $\Delta L$ (in MacAdam units) |
| --- | --- |
| Sample A | +2.7 |
| Sample C | +6.3 |
| Sample D | −0.4 |
| Control | +1.7 |

Using the criterion that downflop predictably can be relied on when the $\Delta L$ differences exceed 1 MacAdam unit, the Control sample compares favorably with the prior art samples.

I claim:
1. A method of producing a highly acicular, crystalline iron oxide (hydrated ferric oxide) which comprises
   a. adding, with agitation, an aqueous solution of ferrous sulfate to an aqueous solution containing at least a stoichiometric equivalent of a base selected from the hydroxides and carbonates of sodium and potassium, thus forming ferrous hydroxide, with the pH of the mixture being maintained at 12 or higher and the temperature of the mixture being maintained in the range of about 20°–35°C.,
   b. aerating the aqueous mixture with an oxygen-containing gas, at a rate of about 0.00145 to about 0.00169 lbs. $O_2$/min./lb. of added $FeSO_4$, said aeration resulting in the formation of nuclei of $Fe_2O_3 \cdot xH_2O$,
   c. aerating the mixture at the rate given in step (b), for a period of from about 10 to about 40 minutes, so that the nuclei grow to acicular-shaped seeds having a diameter of about 6–18m$\mu$ and a length of about 40–80m$\mu$, and until approximately 15 to 40% of the ferrous hydroxide is converted to hydrated ferric oxide, and d. reducing the aeration rate to a range of from about 0.00048 to about 0.00056 lbs. $O_2$/min./lb. of added ferrous sulfate, until the residual ferrous hydroxide is essentially completely converted to hydrated ferric oxide.

2. The method of claim 1 wherein the selected base is sodium hydroxide, and the reaction temperature is about 24°–32°C.

3. The method of claim 1 wherein the product ferric oxide is further filtered, washed and dried.

* * * * *

UNITED STATES PATENT OFFICE
CERTIFICATE OF CORRECTION

Patent No. 3,974,267     Dated August 10, 1976

Inventor(s) Eugene M. Urban, Jr.

It is certified that error appears in the above-identified patent and that said Letters Patent are hereby corrected as shown below:

Col. 2, line 2, "alpah-$Fe_2O_3 \cdot H_2O$" should read -- alpha-$Fe_2O \cdot H_2O$ --.

Col. 2, line 5 "cooperas" should read -- copperas --.

Col. 5, line 52 "0 haze and 100 total transmitted light." should read -- 0 haze and 100 total transmitted light. --.

Col. 5, line 56 "% haze should read -- % haze --.

Col. 5, lines 57-59 ",11 Haze ,20 100X=% Haze Total transmitted" should read

-- $100 \times \frac{\text{Haze}}{\text{Total Transmitted}} = \%\text{ Haze}$ --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*